United States Patent [19]

Barabas et al.

[11] Patent Number: 4,767,427

[45] Date of Patent: Aug. 30, 1988

[54] CARTRIDGE FILTER MOUNTING APPARATUS

[75] Inventors: Joseph A. Barabas, Pen Argyl; Norman D. Phillips, Bethlehem; Joseph G. Polscer, Allentown, all of Pa.

[73] Assignee: Fuller Company, Bethlehem, Pa.

[21] Appl. No.: 115,222

[22] Filed: Oct. 30, 1987

[51] Int. Cl.$^4$ .............................................. B01D 46/42
[52] U.S. Cl. ....................................... 55/493; 55/496; 55/498; 55/502; 55/507; 55/508; 55/509
[58] Field of Search .................. 55/374, 493, 496–499, 55/502, 504, 507–509

[56] References Cited

U.S. PATENT DOCUMENTS

| | | | |
|---|---|---|---|
| 3,097,410 | 7/1963 | Lincoln | 55/374 X |
| 3,618,300 | 11/1971 | Pausch | 55/374 X |
| 4,209,310 | 6/1980 | Berkhoel | 55/498 X |
| 4,322,231 | 3/1982 | Hilzendeger et al. | 55/498 X |
| 4,443,237 | 4/1984 | Ulvestad | 55/498 X |

Primary Examiner—Kathleen J. Prunner
Attorney, Agent, or Firm—Frank H. Thomson

[57] ABSTRACT

A releasable clamping apparatus for securing cartridge filter elements to a tube sheet of a dust collector apparatus. The clamping apparatus includes a clamping band which surrounds the filter element. The tube sheet includes a plurality of spaced apart J-shaped support clips surrounding each opening in the tube sheet. A plurality of latches are attached to the clamping band and cooperate with the support clips to secure the clamping band and the filter element to the tube sheet.

11 Claims, 2 Drawing Sheets

U.S. Patent  Aug. 30, 1988  Sheet 2 of 2  4,767,427
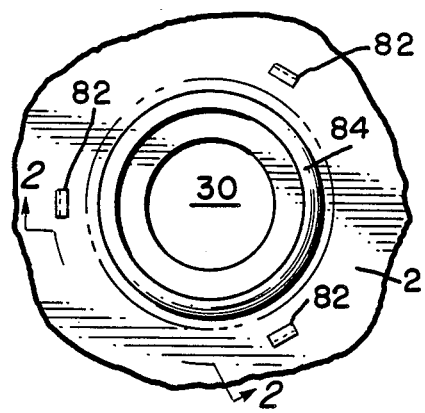
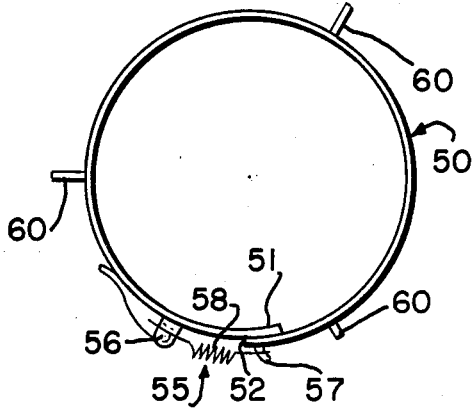
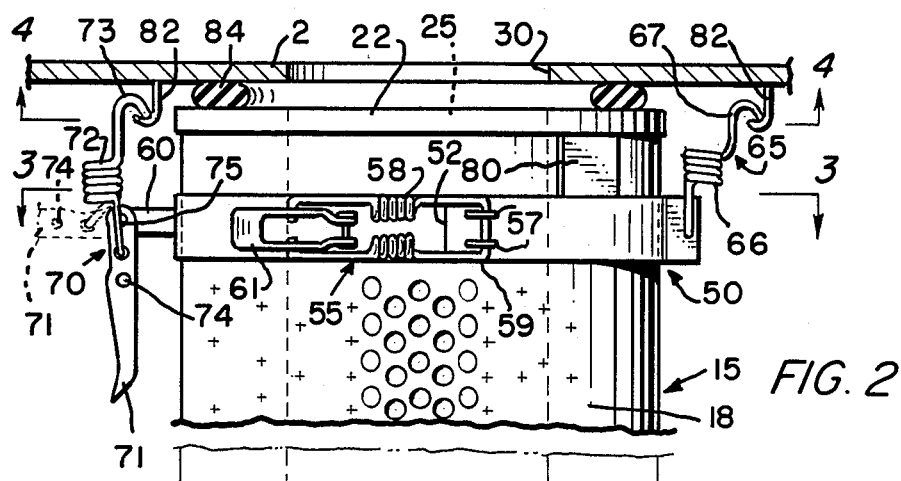

CARTRIDGE FILTER MOUNTING APPARATUS

BACKGROUND OF THE INVENTION

This invention relates to apparatus for filtering a gas stream and in particular to an apparatus for releasably securing a filter element to the tube sheet of a dust collector of the type used for separating particulate material from a gas stream.

Prior to the present invention, various types of fabric filters or bag houses have been known. Typically, fabric filters of the type to which the present invention relates include a filter element mounted on a tube sheet inside the dirty gas compartment of the filter housing. Gas to be filtered enters the dirty gas chamber, for passage through the filter element and through an opening in the tube sheet to the clean gas chamber. Clean gas exits the apparatus to atmosphere. Particulate material contained within the dirty gas stream is collected on the outside surface of the filter element. There are various techniques for removing the particulate material from the surface of the filter element including a shaker system for gently shaking the filter bag and a reverse air cleaning system which includes means for supplying clean air to the inside of the filter element for reverse flow through the filter element. A further technique is to supply a pulse of high pressure air into the filter element which both shakes and causes a reverse air flow. Typically, the particulate material drops into a hopper from which it is discharged to disposal.

Also prior to the present invention it was known to utilize cartridge type filters for carrying out the filtering process. An example of such a cartridge filtering apparatus is shown in U.S. Pat. No. 4,218,227 issued Aug. 19, 1980. These may include a folded paper or fabric which is supported by a cage or screen apparatus.

An important element of a dust collector is the manner in which the filter element is mounted within the dust collector in general. Often, the filter element is secured by some means to the tube sheet. The apparatus utilized must be able to adequately secure the filter element to the tube sheet inside the dirty gas chamber while maintaining a seal between the filter element and the tube sheet. Since it is necessary to periodically change the filter element, the means for securing the filter element to the tube sheet must be capable of easily releasing the filter element from the tube sheet to provide easy maintenance.

Various techniques for securing filter elements to tube sheets of a dust collector are shown, for example, in U.S. Pat. Nos. 4,257,790, 3,508,383, 3,618,300, 3,538,687 and 3,097,410. U.S. Pat. No. 4,292,061 discloses an air filter assembly using a clamping band and latch mechanism in a different field of use as compared with the present invention.

Prior to the present invention, cartridge filters were typically secured within a dust collector by having a rod pass longitudinally through the filter element with the rod secured to the tube sheet as by bolting.

SUMMARY

It is the principle object of this invention to provide an apparatus for releasably securing a filter element to the tube sheet of a dust collector apparatus which is capable of allowing the filter element to be easily removed from the tube sheet.

It is a further object of this invention to provide a quick release clamping mechanism for securing a cartridge type filter to the tube sheet of a dust collector apparatus which requires access to only one compartment of the dust collector.

In general, the foregoing and other objects will be carried out by providing an apparatus for filtering a gas stream comprising a housing having a tube sheet dividing the housing into a dirty gas chamber having an inlet for dirty gas to be filtered and a clean gas chamber having an outlet for filtered gas; said tube sheet having at least one opening therethrough providing communication between the dirty gas chamber and the clean gas chamber; at least one filter element operatively associated with the opening through the tube sheet whereby gas to be filtered enters the dirty gas chamber, flows through the filter element and the opening in the tube sheet to the clean gas chamber and particulate material in the gas stream is collected on the surface of the filter element; and means for securing the filter element to the tube sheet including a removable clamping band surrounding the filter element, a plurality of circumferentially spaced apart support clips secured to the tube sheet and surrounding the opening in the tube sheet and a plurality of latch means mounted on said clamping band, each cooperating with one of said support clips.

Generally speaking, the mounting arrangement includes a clamping band which surrounds the cartridge filter and is releasably secured thereto by means of a tension clamp. The clamping band will include a plurality of circumferentially spaced apart radial mounts. Each mount is adapted to have a latch secured thereto. In the preferred form, one of the latches is a fixed latch with a spring tension element and two latches are releasable with a spring tensioning element. There are an equal number of support clips surrounding the opening in the tube sheet and spaced apart a distance so that the radial mounts and associated latch members on the clamping band can be aligned with the support clips. Since the apparatus is applied to a cartridge filter which will include an annular cap, spacer elements are positioned between the clamping band and the annular cap. This spacer element may be secured to the clamping band. A gasket which may be integral with the filter element is positioned between the tube sheet and the annular filter cap to provide a seal. To install the cartridge filter, the operator first attaches the removal clamping band to the shell of the filter element with the spacer elements providing a proper guide for positioning the clamping band. The latches are then used to secure the filter element to the mounting clips of the tube sheet in a manner described herein. The gasket is compressed between the top of the filter element and the tube sheet to provide a seal and prevent dirty gas from by-passing the filter element to flow directly from the dirty gas chamber to the clean gas chamber.

BRIEF DESCRIPTION OF THE DRAWINGS

The invention will be described with the annexed drawings wherein:

FIG. 2 is an elevation view on an enlarged scale of the cartridge filter secured to the tube sheet of a dust collector with details of the clamping apparatus of the present invention;

FIG. 3 is a view of the clamping band taken on the line 3—3 of FIG. 2; and

FIG. 4 is a view taken on the line 4—4 of FIG. 2 showing the support clips secured to the tube sheet of the present invention.

DESCRIPTION OF THE PREFERRED EMBODIMENT

Figure 1:
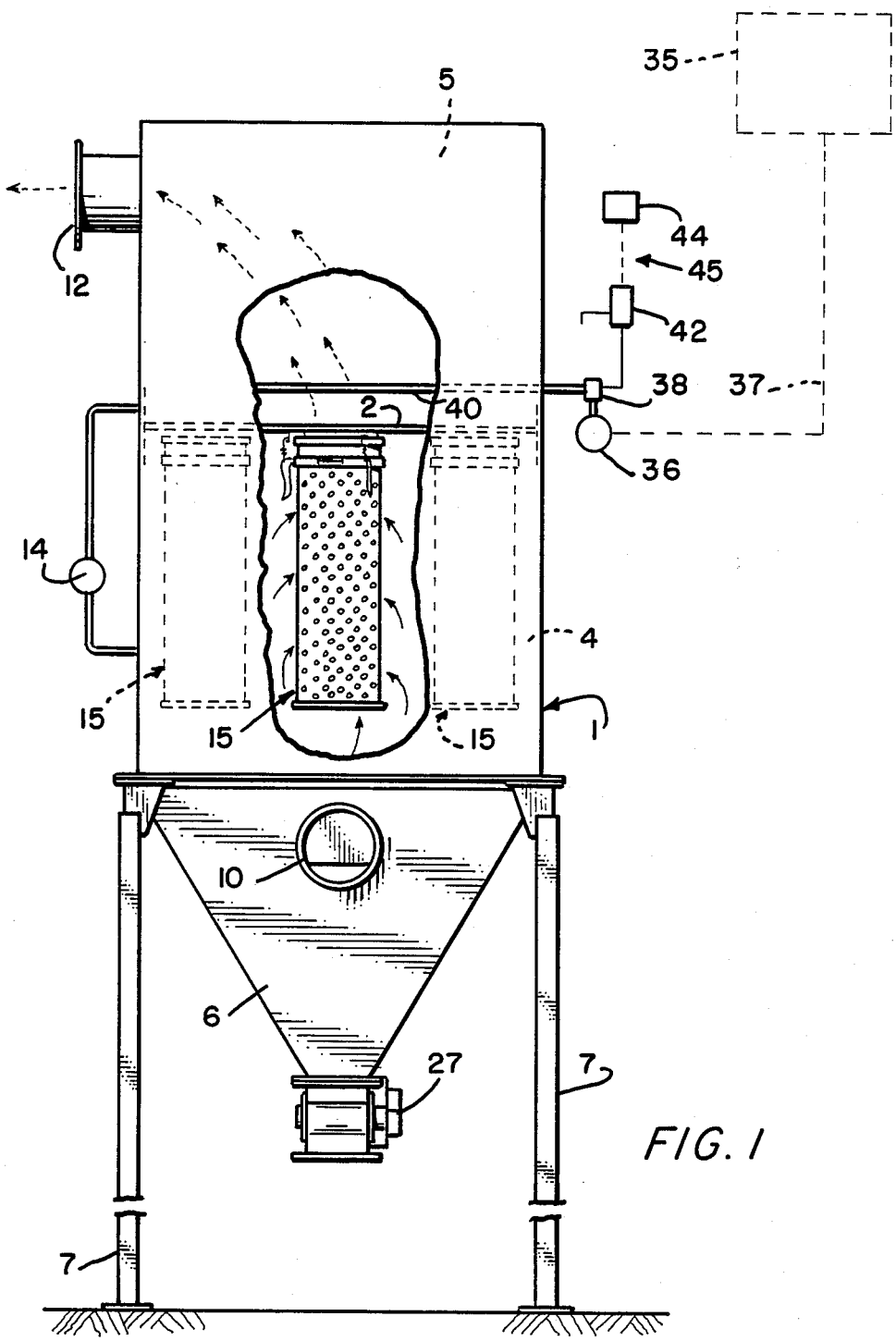
FIG. 1 is a diagramatic view partly in section of a cartridge filter dust collector of the type to which the present invention relates.

Referring to FIG. 1 there is shown a cartridge type dust collector apparatus which includes a casing generally indicated at 1 including a tube sheet 2 mounted therein dividing the casing or housing 1 into a lower dirty gas chamber 4 and an upper clean gas chamber 5. A hopper 6 is mounted on the bottom of the casing or housing 1. The dust collector may be supported on support legs 7 in a manner generally known in the art. The hopper includes a dirty gas inlet 10 and the apparatus includes a clean gas outlet 12 suitably connected to atmosphere. A differential pressure gauge 14 may be utilized for measuring the differential pressure across the tube sheet 2.

The dust collector apparatus includes a plurality of cartridge filter elements 15 mounted in the dirty gas chamber 4 of the housing 1 as shown in FIGS. 1 and 2. The present invention is particularly adapted but is not intended to be limited to a cartridge filter apparatus. A cartridge filter element includes an inner screen 17 and an outer screen 18 of perforated metal or screen. A filter medium such as pleated porous paper is between the inner screen 17 and the outer screen 18 and generally indicated at 20. The cartridge filter also includes an annular filter cap or ring 22 and a lower or bottom closure element 24. The inner and outer screen 17 and 18 respectively define an opening 25 in the filter element which is closed on the bottom by the bottom closure 24 and open at the top by the annular cap 22. The filter element is suitably secured to the tube sheet 2 so that it is aligned with one of a plurality of openings 30 in the tube sheet 2. The filter element consisting of the inner and outer screens 17 and 18 and the filter medium 20 and the cap 22 and bottom 24 is typically purchased as a unitary element. With prior practice, a rod is secured to the bottom 24 and extends upwardly through the opening 25 and an opening in the tube sheet to be bolted to the tube sheet; see generally U.S. Pat. No. 3,508,383 and 4,218,227 for such an attachment mechanism. With such prior apparatus, replacement of the filter element requires access to both compartments of the dust collector and the use of special tools. With the present invention, the filter element can be replaced quickly, without tools and by access to only one compartment of the dust collector.

In operation of the dust collector, dirty gas to be filtered will enter the dirty gas inlet 10, flow through the filter element 15 and the opening 30 in the tube sheet 2 to the clean gas chamber 5 and the clean gas outlet 12. Particulate material contained in the gas to be filtered is collected on the surface of the filter medium 20. As particulate material builds up on the surface of the filter medium, the pressure drop across the tube sheet 2 will increase and it will become necessary to remove the collected particulate material from the surface of the filter medium. In order to carry this out, according to one method of cleaning, a pulse of high pressure air is injected into the aream 25 in the cartridge filter element 15 to provide a gentle shake of the filter element and a reverse flow of air through the filter medium. This causes the collected particulate material to drop into hopper 6 from where it may be discharged through a discharge means 27 such as a rotary feeder.

In the illustrated embodiment, the cleaning apparatus includes a source of compressed air 35 which may be connected to a header 36 by means of a compressed air line 37. A pulse valve 38 controls the flow of compressed air from the header 36 to a cleaning air or reverse air supply pipe 40. Openings in the pipe 40 direct compressed air through opening 30 in the tube sheet 2 into the area 25 in a manner generally known in the dust collector art. A solenoid valve 42 and a timer 44 complete the control means generally indicated at 45. In operation, the timer 44 will be utilized to periodically operate through the control means 45 and solenoid 42 and the pulse valve 38 to allow compressed air to be supplied from the source at 35 through header 36, pipes 40 and openings therein to direct a pulse of compressed air into the filter element 15. This pulse of clean air will serve to remove the collected dust from the surface of the filter medium in a manner generally known in the art.

The clamping apparatus of the present invention includes a clamping band generally indicated at 50 which clamping band is adapted to surround the filter element 15. As illustrated in FIG. 3, the clamping band 50 includes one free end 51 and another free end 52 which overlap during use. The one end 51 has secured thereto a tension clamp generally indicated at 55 with a hinge pin 56 securing the tension clamp to the end 51. The other end 52 includes a pair of hooks 57. The tension clamp includes a U-shaped spring 58 with the base 59 adapted to cooperate with the hooks 57. A latch element 61 forms part of the tension clamp 55. The clamping band 50 is adapted to surround the filter element 15 and be tightly secured thereto by moving the latch member 61 into a closed position to exert a tension on the clamping member by the tension clamp and hooks 57 cooperating with each other. The clamping band per se is similar to that shown in U.S. Pat. No. 3,097,410 issued July 16, 1963. It is important to adjust the latch element so that the filter element is securely held but not so tight as to unduly distort the filter element and/or outer screen 18.

The clamping band 50 includes a plurality of circumferentially spaced apart radial mounts 60. In the preferred form there are three such mounts. Each radial mount includes a latch means mounted thereon. In the preferred form, one of the latch mounts is a fixed latch with a spring tension element and is indicated at 65. This includes a coil spring 66 and a hook member 67. Also in the preferred embodiment there are two adjustable latch means 70 which include release means 71 with a spring tensioning element 72 which also includes a hook member 73. The release means can include adjustment holes 74 and is connected to the mount 60 through a hinge pin or pivot pin 75. The clamping band 50 includes one or more spacer elements 80 positioned between the top of the clamping band 50 and the bottom of the annular cap 22. These spacer elements serve to properly position the clamping band along the axial length of the filter element.

The tube sheet 2 includes a plurality of circumferentially spaced apart support clips 82 which are J-shaped. Each opening 30 in the tube sheet has a number of clips surrounding it. These clips 82 are spaced apart a distance which corresponds with the spacing of the mounts 60. The number of support clips and radial mounts 60 are selected according to the size of the filter element, but it is believed that three clips and mounts will be appropriate. A latch member 65 or 70 will cooperate with each clip 82 to support and secure a filter element to the tube sheet.

A gasket member 84 is designed to be positioned between the top of the cap member 22 and the bottom of the tube sheet 2 for providing a seal between the filter element and the tube sheet. This gasket is normally integral with the filter element and annular cap 22 but may be a separate unit.

In order to install a cartridge filter element onto the tube sheet, the installer first attaches the clamping band to the cartridge filter element by opening the tension clamp 55, slipping the band over the cartridge filter element until it is properly positioned relative to the top of the filter element. The spacer members 80 are used for this purpose and are dimensioned depending upon the length of the latch members 65 and 70, the thickness of the cap 22 and compressibility of gasket 84. Once the band 50 is properly positioned, the clamping lever 61 snapped into position to secure the clamping band 50 to the filter element 15 in a manner which is sufficiently tight to hold the clamping band in a fixed position but not so tight as to distort the screen 18 and filter medium 20. The spacer element 80 is positioned between the clamping band 50 and the bottom lip of the element 22.

Once the band 50 is in place, the cartridge is then lifted into position and the hook 67 of the fixed latch 65 is fitted onto an associated J-shaped support clip 82. The cartridge is then tilted into place and clamped into its final position by placing the hook medium 73 over their associated J-shaped support clips of two adjustable latches 70 and latching them in place. As should be apparent, this is accomplished by pivoting the release means 71 around pin 75 from the position shown in dotted lines in FIG. 2 to the position shown in solid lines in FIG. 2. The installer will then check to see that the gasket 84 is properly compressed and a seal exists between the tube sheet 2 and the top of the filter element 15. The cartridge can be removed by releasing the two adjustable latches 70 and rotating the cartridge filter until it is free. This is a simple operation which can be performed by a single maintenance person, without tools. All work is performed from within the compartment 4 of the collector.

The latch mechanisms 65 and 70 and the spacers 80 should be dimensioned so that the filter element will be lifted up against the bottom of the tube sheet 2 and the gasket 84 sufficiently compressed so that a seal is formed to prevent leakage of gas from the compartment 4 through opening 30 to compartment 5 bypassing the filter element. The springs 66 and 72 will serve to place the clamping band and filter element in tension. In order to assure proper tensioning the movable latching means 70 includes adjustment holes 74.

The filter element is removed in the opposite manner, i.e., the release means 71 is pivoted from the closed position shown in solid lines to the open position shown in dotted lines, the hooks 73 removed from their associated clip 82 and the filter element titled away from the tube sheet so that the hook 67 of fixed latch 65 is removed from its associated clip 82. The latch means 55 is then opened so that the clamping band can be removed from the filter element 15 for reuse on a new filter element.

From the foregoing it should be apparent that the objects of the invention have been carried out. An adjustable quick release clamping mechanism has been provided for a cartridge filter apparatus. It is intended that the invention not be limited by the foregoing descriptions but wholly limited by that which is within the scope of the attached claims.

We claim:

1. Apparatus for filtering a gas stream comprising a housing having a tube sheet dividing the housing into a dirty gas chamber having an inlet for dirty gas to be filtered and a clean gas chamber having an outlet for filtered gas; said tube sheet having at least one opening therethrough providing communication between the dirty gas chamber and the clean gas chamber; at least one filter element operatively associated with the opening through the tube sheet whereby gas to be filtered enters the dirty gas chamber, flows through the filter element and the opening in the tube sheet to the clean gas chamber and particulate material in the gas stream is collected on the surface of the filter element; and means for securing the filter element to the tube sheet including a removable clamping band surrounding the filter element, a plurality of circumferentially spaced apart support clips secured to the tube sheet and surrounding the opening in the tube sheet and a plurality of latch means mounted on said clamping band; each cooperating with one of said support clips.

2. Apparatus for filtering a gas stream according to claim 1 wherein each of said latch means includes a spring between the clamping band and its associated support clip.

3. Apparatus for filtering a gas stream according to claim 2 wherein at least one of said latch means includes release means for releasing the latch means from its associated support clip.

4. Apparatus for filtering a gas stream according to claim 3 wherein said filter element includes an annular filter cap at one end thereof between the tube sheet and the clamping band, a spacer element is positioned between said clamping band and said filter cap whereby said latch means urge the clamping band, spacer element, filter cap and filter element toward the tube sheet.

5. Apparatus for filtering a gas stream according to claim 4 further comprising a gasket between said filter cap and said tube sheet providing a seal between the filter element and the tube sheet for preventing leakage around said filter element through the opening in the tube sheet.

6. Apparatus for filtering a gas stream according to claim 5 wherein said clamping band includes a tension clamp for removably securing the clamping band to the filter element.

7. In a dust collector having a filter element and means for releasably securing the filter element to a tube sheet of the dust collector, said filter element including an annular filter cap at one end thereof and said tube sheet having at least one opening therein, an improved apparatus for releasably securing the filter element to the tube sheet comprising a plurality of circumferentially spaced apart support clips secured to the tube sheet around the opening; a clamping band surrounding the filter element; a plurality of latch means mounted on said clamping band, each cooperating with one of the support clips on said tube sheet and at least one spacer element between said clamping band and the filter cap for positioning said clamping band on said filter element.

8. Apparatus according to claim 7 wherein at least one of said latch means is a fixed latch with a spring tensioning element and at least one of said latch means includes a release means with a spring tensioning element.

9. Apparatus according to claim 8 wherein said clamping band includes a tension clamp for removably securing the clamping band to the filter element.

10. Apparatus according to claim 9 wherein said release means is adjustable.

11. Apparatus according to claim 10 wherein said clamping band is a circular band having two free ends which overlap, a U-shaped spring tension clamp is mounted on one end of the band and a hook is mounted on the other end of the band and the base of the U-shaped spring is releasably connected to the hook for securing the clamping band to the filter element.

* * * * *